March 15, 1960 P. F. SAMS ET AL 2,928,494
APPARATUS FOR TREATING AIR
Filed Nov. 19, 1958
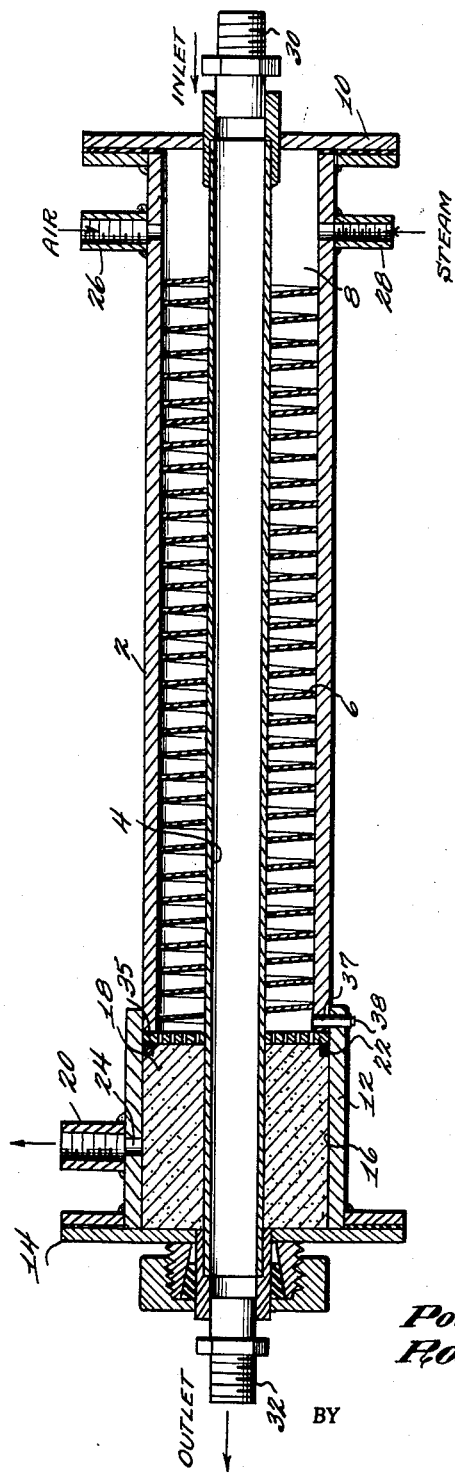
INVENTOR
POWELL F. SAMS
ROBERT L. TEDERS
BY
ATTORNEY

2,928,494
APPARATUS FOR TREATING AIR

Powell F. Sams and Robert L. Teders, Minneapolis, Minn., assignors to The Pillsbury Company, Minneapolis, Minn., a corporation of Delaware Application November 19, 1958, Serial No. 775,032

3 Claims. (Cl. 183—4.3)

This invention relates to apparatus for treating air, and more particularly, to one which is adapted to sterilize, filter and humidify.

In numerous experimental and/or commercial processes, it is frequently necessary or desirable to furnish air which is not only free of dirt and other contaminants such as organisms, but which is also very nearly saturated with water vapor so that the air does not cause any substantial water loss in the process. For example in order to maintain sterile conditions in aerobic fermentation it is absolutely essential that the air introduced into the fermentation batch be free of organisms. It is also necessary that, in such a process, the air which is introduced into the fermentation tank be nearly saturated whereby the circulating air cannot cause any substantial water loss by removing water from the fermentation medium.

It is among the objects of the present invention to provide an apparatus which will so treat air as to render it both sterile and saturated or substantially so.

Another object is the provision of an apparatus of the class described which is not only efficient in operation, but which is simple and inexpensive to manufacture, install and maintain and which will occupy a minimum of valuable plant space.

The invention, then, comprises the features hereinafter fully described and as particularly pointed out in the claims and annexed drawing, the following description setting forth in detail certain illustrative embodiments of the invention, these being indicative of but several of a number of ways in which the principles of the invention may be employed.

The sole figure of the drawing is a plan view, partly in section, of an apparatus embodying the teachings of the present invention.

Referring more particularly to the drawing, the numeral 2 designates a cylindrical housing within which there is disposed a concentric tube 4.

Within the annular space between the outer wall of the tube 4 and the inner wall of the cylindrical housing 2, there is a helically wound strip 6 which provides a helicoid passageway.

As shown, the right-hand end of the helically wound strip 6 terminates short of the adjacent ends of the cylindrical housing 2 and the concentrically disposed tube 4, thereby providing an annular chamber 8, the purpose of which will be later described.

The outer side of this annular chamber 8 is closed by an end plate 10 having a central opening which communicates with the adjacent end of the tube 4.

The other end of the cylindrical housing 2 telescopes partially within a sleeve 12, the latter being provided with an end plate 14. Thus, there is provided within the sleeve 12 an annular chamber 16; and this is filled with suitable packing 18, such as activated charcoal or other material capable of further purifying the saturated air.

Referring still to the left-hand end of the cylindrical housing 2, the sleeve 12 is provided approximately midway between the end plate 14 and the adjacent end of the helically wound strip 6 with a peripheral fluid outlet 20 which communicates with the apertures to which the sterile and humid air is to be furnished.

As shown, an annular filter plate 22 is disposed between the packing 18 in the annular chamber 16 and the adjacent end of the helically wound strip 6. This annular filter plate 22 is so constructed and arranged as to remove organisms and impurities of the size desired; for example those which are larger than two microns in size.

If desired, the fluid outlet 20 may be provided with a filter plate 24 for further purification.

Referring to the right-hand end of the drawing, the cylindrical housing 2 is provided approximately midway of the end plate 10 and the adjacent end of the helically wound strip 6 with peripherally disposed inlets 26 and 28, the former being for air, and the latter for steam.

A coupling 30 is provided for the central opening in the end plate 10 which, as shown, communicates with the adjacent end of the tube 4. This coupling 30 is connected to a suitable source of steam or hot water for heating only; and the opposite end of the tube 4 is provided with a coupling 32 for withdrawing or exhausting the steam or hot water so supplied.

In order to maintain the annular filter plate 22 in contact with the adjacent end of the cylindrical housing 2, a holding ring 35 is provided, the same being disposed within the sleeve 12 which contains the packing 18. On the opposite side of the annular filter plate 22, a drain 37 extends through the side wall of the cylindrical housing 2 and the adjacent portion of the sleeve 12, being closed by a suitable plug 38.

Our apparatus provides the most efficient destruction of organisms by providing for simultaneously heating and humidifying. Furthermore the helicoid motion of the air deposits dust, dirt and other contaminating matters in the condensate present on the inner wall of cylindrical housing 2 which is continuously removed from the apparatus through a drain positioned in the wall of cylindrical housing tube upstream of plate 22 and does not, therefore, enter and clog the filters.

There are also many other advantages in our apparatus including ease and simplicity of maintenance, low cost and minimum space requirements. We have also found that the capacity and efficiency of our apparatus will not diminish after as much as 70 hours of continuous operation. Moreover since our apparatus does not require an operator's attention it is readily adaptable to automatic controls.

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. Apparatus for treating air comprising a cylindrical housing, a conduit extending through said cylindrical housing, a helicoid passageway extending diametrically between the outer wall of said conduit and the inner wall of said cylindrical housing, a closure for each end of said cylindrical housing, the ends of said helicoid passageways being spaced from said closures thereby providing an annular chamber at each end of said cylindrical housing, independent means for supplying both air and steam to one of said annular chambers, filtering means in the other of said annular chambers, a fluid outlet for said second-named annular chamber, and means for imparting heat to the interior of said conduit.

2. Apparatus for treating air comprising a first cylindrical housing, a tube extending through and projecting from said first cylindrical housing, a helicoid passageway extending diametrically between the outer wall of said tube and the inner wall of said first cylindrical housing, a closure for one end of said first cylindrical housing, means for circulating a heated fluid through said tube, said means communicating through said closure, the end of said helicoid passageway which is adjacent said closure being spaced therefrom, thereby providing an annular chamber between said first cylindrical housing and said tube, independent means for supplying both air and steam to said annular chamber, a second cylindrical housing extending from the opposite end of said first cylindrical housing, a closure for the outer end of said second cylindrical housing, said last-mentioned closure being spaced from the adjacent end of said helicoid passageway, thereby providing an annular chamber between said second cylindrical housing and said tube, filtering means in said second-named annular chamber, and a fluid outlet for said second-named annular chamber.

3. Apparatus for treating air comprising a cylindrical housing, a tube extending through and projecting from said cylindrical housing, a helicoid baffle extending between the outer wall of said tube and the inner wall of said cylindrical housing, a closure for one end of said cylindrical housing, means for circulating a heated fluid through said tube, said means communicating through said closure, the end of said helicoid baffle which is adjacent said closure being spaced therefrom, thereby providing an annular chamber between said cylindrical housing and said tube, independent means for supplying both air and steam to said annular chamber, a sleeve disposed telescopically over the opposite end of said cylindrical housing, a closure for the outer end of said sleeve, said last-mentioned closure being spaced from the adjacent end of said helicoid baffle thereby providing a second annular chamber between said cylindrical housing and said tube, filtering media in said second-named annular chamber, a filter element between said filtering media and the adjacent end of said helicoid passageway, a fluid outlet for said second-named annular chamber, and a filter element for said fluid outlet.

References Cited in the file of this patent

UNITED STATES PATENTS

| 1,461,045 | Paasche | July 10, 1923 |
| 2,229,860 | McCurdy | Jan. 28, 1941 |
| 2,232,913 | Heaberger | Feb. 25, 1941 |